(12) United States Patent
Alvarez et al.

(10) Patent No.: US 7,880,770 B2
(45) Date of Patent: Feb. 1, 2011

(54) CAMERA CONTROL

(75) Inventors: Donald Alvarez, Woodinville, WA (US); Mark Parry, Huntington Beach, CA (US)

(73) Assignee: Accelerated Pictures, Inc., Redmond, WA (US)

( * ) Notice: Subject to any disclaimer, the term of this patent is extended or adjusted under 35 U.S.C. 154(b) by 579 days.

(21) Appl. No.: 11/829,548

(22) Filed: Jul. 27, 2007

(65) Prior Publication Data

US 2008/0024615 A1    Jan. 31, 2008

Related U.S. Application Data (60) Provisional application No. 60/834,216, filed on Jul. 28, 2006.

(51) Int. Cl.
*H04N 5/232* (2006.01)
*G06F 3/033* (2006.01)

(52) U.S. Cl. .................................... 348/211.7; 345/161

(58) Field of Classification Search ................ 348/143, 348/211.7–14, 207.1, 207.11, 211.99; 345/156, 345/157, 473; 700/251
See application file for complete search history.

(56) References Cited

U.S. PATENT DOCUMENTS

| | | | |
|---|---|---|---|
| 3,574,954 A | 4/1971 | Schone | |
| 5,032,842 A | 7/1991 | Tanigaki et al. | |
| 5,129,044 A | 7/1992 | Kashiwagi et al. | |
| 5,268,996 A | 12/1993 | Steiner et al. | |
| 5,617,515 A | 4/1997 | MacLaren et al. | |
| 5,644,722 A | 7/1997 | Miyamoto et al. | |
| 5,658,238 A | 8/1997 | Suzuki et al. | |
| 5,752,244 A | 5/1998 | Rose et al. | |
| 5,764,276 A | 6/1998 | Martin et al. | |
| 5,764,980 A | 6/1998 | Davis et al. | |
| 5,790,124 A | 8/1998 | Fischer et al. | |
| 5,864,404 A | 1/1999 | Amorosi | |
| 5,909,218 A | 6/1999 | Naka et al. | |
| 5,921,659 A | 7/1999 | Hunt et al. | |
| 5,973,668 A * | 10/1999 | Watanabe | 345/157 |
| 6,005,548 A | 12/1999 | Latypov et al. | |
| 6,058,397 A | 5/2000 | Barrus et al. | |

(Continued)

FOREIGN PATENT DOCUMENTS

WO    WO 2006/024078    3/2006

(Continued)

OTHER PUBLICATIONS

Schneck, P.B., "Persistent Access Control to Prevent Piracy of Digital Information," Proceedings of the IEEE, vol. 87, Issue 7, Jul. 1999, pp. 1239-1250.

(Continued)

*Primary Examiner*—Lin Ye
*Assistant Examiner*—Trung Diep
(74) *Attorney, Agent, or Firm*—Townsend and Townsend and Crew, LLP (57) ABSTRACT

Tools for controlling cameras (and other objects), using an input device. Some such tools may establish a threshold, above which the input from the input device is fed directly to the object being controlled, and below which the input signal is processed to provide smoother operation. This can allow for direct control over a camera (or other object) in large movements but still allow for smooth, controlled movements when slower movement is desired.

22 Claims, 7 Drawing Sheets

U.S. PATENT DOCUMENTS

| | | | |
|---|---|---|---|
| 6,084,590 | A | 7/2000 | Robotham et al. |
| 6,184,867 | B1 * | 2/2001 | Kandogan et al. ............ 345/161 |
| 6,199,082 | B1 | 3/2001 | Ferrel et al. |
| 6,219,045 | B1 | 4/2001 | Leahy et al. |
| 6,222,551 | B1 | 4/2001 | Schneider et al. |
| 6,222,560 | B1 | 4/2001 | Naka et al. |
| 6,268,864 | B1 | 7/2001 | Chen et al. |
| 6,278,466 | B1 | 8/2001 | Chen |
| 6,329,994 | B1 | 12/2001 | Gever et al. |
| 6,377,257 | B1 | 4/2002 | Borrel et al. |
| 6,414,684 | B1 | 7/2002 | Mochizuki et al. |
| 6,538,651 | B1 | 3/2003 | Hayman et al. |
| 6,546,405 | B2 | 4/2003 | Gupta et al. |
| 6,557,041 | B2 | 4/2003 | Mallart |
| 6,559,845 | B1 | 5/2003 | Harvill et al. |
| 6,609,451 | B1 | 8/2003 | Inoue et al. |
| 6,642,867 | B1 * | 11/2003 | Chowdhury et al. ......... 341/118 |
| 6,646,643 | B2 | 11/2003 | Templeman |
| 6,697,869 | B1 | 2/2004 | Mallart et al. |
| 6,714,200 | B1 | 3/2004 | Talnykin et al. |
| 6,738,065 | B1 | 5/2004 | Even-Zohar |
| 6,752,719 | B2 * | 6/2004 | Himoto et al. ................ 463/37 |
| 6,757,432 | B2 | 6/2004 | Hijiri et al. |
| 6,760,010 | B1 | 7/2004 | Webb |
| 6,806,864 | B2 | 10/2004 | Rahn et al. |
| 6,820,112 | B1 | 11/2004 | Matsuda et al. |
| 6,898,484 | B2 | 5/2005 | Lemelson et al. |
| 6,947,044 | B1 | 9/2005 | Kulas |
| 6,975,113 | B1 * | 12/2005 | Gurr ........................... 324/309 |
| 6,975,302 | B1 * | 12/2005 | Ausbeck, Jr. ................ 345/161 |
| 7,245,741 | B1 | 7/2007 | Ertl et al. |
| 7,266,425 | B2 | 9/2007 | Bhatt et al. |
| 7,345,670 | B2 * | 3/2008 | Armstrong .................. 345/156 |
| 7,400,348 | B2 * | 7/2008 | Hoyos .................... 348/211.99 |
| 7,570,249 | B2 * | 8/2009 | Han et al. ................... 345/166 |
| 2001/0007452 | A1 | 7/2001 | Naka et al. |
| 2001/0020943 | A1 | 9/2001 | Hijiri et al. |
| 2001/0051535 | A1 | 12/2001 | Kamimura et al. |
| 2002/0024517 | A1 | 2/2002 | Yamaguchi et al. |
| 2002/0089506 | A1 | 7/2002 | Templeman |
| 2002/0138843 | A1 | 9/2002 | Samaan et al. |
| 2002/0167518 | A1 | 11/2002 | Migdal et al. |
| 2002/0175994 | A1 | 11/2002 | Sakakibara et al. |
| 2002/0186221 | A1 | 12/2002 | Bell |
| 2003/0047602 | A1 | 3/2003 | Iida et al. |
| 2003/0080978 | A1 | 5/2003 | Navab et al. |
| 2003/0090523 | A1 | 5/2003 | Hayashi et al. |
| 2003/0137516 | A1 | 7/2003 | Harvill et al. |
| 2003/0195853 | A1 | 10/2003 | Mitchell |
| 2004/0001064 | A1 | 1/2004 | Boyd et al. |
| 2004/0114786 | A1 | 6/2004 | Cannon et al. |
| 2004/0119716 | A1 | 6/2004 | Park et al. |
| 2004/0167924 | A1 | 8/2004 | Kuroki |
| 2004/0179013 | A1 | 9/2004 | Menache |
| 2004/0181548 | A1 | 9/2004 | Thomas et al. |
| 2004/0189702 | A1 | 9/2004 | Hlavac et al. |
| 2004/0252123 | A1 | 12/2004 | Estrada et al. |
| 2004/0263476 | A1 | 12/2004 | Lim et al. |
| 2005/0052406 | A1 * | 3/2005 | Stephanick et al. ......... 345/156 |
| 2005/0225552 | A1 | 10/2005 | Anand |
| 2005/0248577 | A1 | 11/2005 | Birdwell |
| 2006/0036162 | A1 | 2/2006 | Shahidi et al. |
| 2006/0055664 | A1 * | 3/2006 | Repetto et al. .............. 345/156 |
| 2006/0074527 | A1 | 4/2006 | Bhatt et al. |
| 2006/0106494 | A1 | 5/2006 | Alvarez et al. |
| 2006/0109274 | A1 | 5/2006 | Alvarez et al. |
| 2006/0136972 | A1 * | 6/2006 | Metzger et al. ............. 725/105 |
| 2007/0283263 | A1 * | 12/2007 | Zawde et al. ................ 715/700 |
| 2008/0028312 | A1 | 1/2008 | Alvarez et al. |

OTHER PUBLICATIONS

Uczekaj, J. et al., "Tailoring Configuration Management Tools for Development of Avionics Software," Proceedings of the IEEE/AIAA/NASA 9th Digital Avionics Systems Conference, Oct. 15-18, 1990, pp. 493-498.

U.S. Appl. No. 11/262,492, Office Action dated Jan. 28, 2008, 37 pages.

U.S. Appl. No. 11/261,441, Office Action dated Jan. 11, 2008, 21 pages.

U.S. Appl. No. 11/829,722, Office Action dated Jun. 25, 2008, 21 pages.

U.S. Appl. No. 11/261,441, Notice of Allowance dated May 23, 2008.

* cited by examiner

CAMERA CONTROL

CROSS-REFERENCE TO RELATED APPLICATIONS

The present disclosure may be related to the following commonly assigned applications/patents (referred to herein as the "Related Applications"):

This application claims priority from co-pending provisional U.S. Patent Application No. 60/834,216 filed Jul. 28, 2006 by Alvarez, et al. and entitled "Improved Camera Control," which is hereby incorporated by reference, as if set forth in full in this document, for all purposes.

This application is related to U.S. patent application Ser. No. 11/262,492, filed Oct. 28, 2005 by Alvarez et al. and entitled "Client/Server-Based Animation Software, Systems and Methods," which is hereby incorporated by reference, as if set forth in full in this document, for all purposes.

This application is also related to U.S. patent application Ser. No. 11/261,441, filed Oct. 28, 2005 by Alvarez et al. and entitled "Camera and Animation Controller, Systems and Methods," which is hereby incorporated by reference, as if set forth in full in this document, for all purposes.

This application is further related to U.S. patent application Ser. No. 11/829,722, filed on a date even herewith by Alvarez et al. and entitled "Scene Organization in Computer-Assisted Filmmaking" (attorney docket no. 020071-000410US), which is hereby incorporated by reference, as if set forth in full in this document, for all purposes.

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates the field of computer-assisted animation and filmmaking in general, and in particular to the control of virtual and real cameras.

BACKGROUND

The operator of a virtual (or real) camera frequently wishes to perform camera motions which end with a smooth transition to a stationary state. Virtual camera motions which involve smooth transitions to a stationary state are frequently desired in part because camera operators and audiences are accustomed to the motion of physical cameras whose motion is governed by inertial properties.

Typically, in control systems in which the speed of the camera motion is controlled by an input device such as a joystick, dynamic range issues prevent or significantly complicate the task of creating a smooth transition to a stationary state, particularly if the transition or "ease out" is to occur over a period of several seconds.

While it is possible to adjust the sensitivity curve of the controls (as discussed, for example, in U.S. patent application Ser. No. 11/261,441, already incorporated by reference) in order to expand the low-velocity region of the of the control system without sacrificing dynamic range and high velocity control, doing so generally results in a control system which is less satisfactory for general usage due to the changed sensitivity profile of the device. In particular, the sensitivity changes can raise the difficulty of causing the camera to start moving—from a still position—in a desired manner.

A common technique for smoothing the motion of real and virtual objects is to incorporate an inertial simulation into the control system. Such an inertial simulation is effectively a filter (e.g., a band pass filter) on the velocity of the device under control. Inertial solutions provide desirable motion but introduce a delay, or phase lag, into the control system, which is undesirable and which complicates the operator's task. The introduction of an inertial system frequently also complicates the operator's task on those occasions when a rapid transition from moving to stationary is desired (as useful as smooth transitions are, they are only one component of the storytelling grammar of the camera).

Thus, there are three complexities associated with this "ease out" problem. First, the problem is largely asymmetrical because it is far more common for a camera operator to want a slow transition to a stop than to want a slow transition to moving from a stop. Second, introducing delay or phase lag into the system is not generally desirable. Third, the mathematical properties of the desired transition differ from use to use.

There is a need for control systems that provide more robust tools for operating cameras, including without limitation, tools that address the ease out problem.

BRIEF SUMMARY

Embodiments of the invention provide tools for controlling cameras (as well as other objects), using an input device such as a joystick or game pad (to name but two examples). In one aspect, some embodiments establish a threshold, above which the input from the input device is fed directly to the object being controlled, and below which the input signal is processed to provide smoother operation. Beneficially, this feature provides a user (such as a camera operator, animator, etc.) with the ability have direct control over the (real or virtual) movement of a filmmaking tool using an input device, while also allowing for simulated and/or indirect control (e.g., processing of the input from the input device) under certain circumstances, which can include, merely by way of example, when the input device is close to a neutral position at which no input signals are generated. Thus, for instance, certain embodiments of the invention can allow for direct control over a camera in large movements but still allow for smooth, controlled movements when slower movement is desired (such as in an ease out situation).

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within a filmmaking application and/or might be provided as a separate computer program specifically for controlling an object such as a filmmaking tool.

Hence, one set of embodiments provides methods, including without limitation, methods of controlling operation of a camera (or other filmmaking tool) using an input device and/or a control system. One such method comprises providing an input device for a user to provide input for controlling operation of a camera. In an aspect, the input device might comprise a manipulable control that has a neutral position. In a particular set of embodiments, when the manipulable control is in a neutral position, the input device might provide no input signal (and/or might provide an input signal indicating that the controlled camera should have no movement, change in focal length, etc.).

In some embodiments, the method further comprises establishing a threshold perimeter around the neutral position of the input device and/or receiving a first input signal from the input device. This first input signal might result from manipulation of the manipulable control. The method, in an aspect, further comprises determining whether the manipulable control is within the threshold perimeter. Based on a determination that the manipulable control is in fact within the threshold perimeter, the first input signal may be processed to produce an output signal that simulates a desired control stimulus for the camera. The method, in some embodiments, further comprises transmitting the output signal to control operation of the camera.

In a particular set of embodiments, the input signal is processed to produce an output signal that has a time-dependent output curve. In one aspect, the time-dependent output curve simulates a varying position of the manipulable control over a specified period of time. In another aspect, the time-dependent curve is defined by a first, actual position $x_1$ of the manipulable control at a first point $t_1$ in time and a second, simulated position $x_2$ of the manipulable control at a second point $t_2$ in time. The first point in time $t_1$ might correspond substantially to a time of determination that the manipulable control is within the threshold perimeter, and/or actual position $x_1$ of the manipulable control might be located substantially at the threshold perimeter.

Another set of embodiments provides methods of controlling operation of a filmmaking tool using an input device. One such method comprises providing an input device for a user to provide input for controlling operation of a filmmaking tool. The input device might comprise a manipulable control configured to provide an input signal in response to manipulation by a user. The input signal might have varying levels. The method, in one aspect, further comprises establishing a threshold input signal level. In another aspect, the method might comprise receiving (e.g., at a control system), a first input signal from the input device, the first input signal resulting from manipulation of the manipulable control.

In some embodiments, the method further comprises determining whether the first input signal has a level below the threshold input signal level, and/or based on such a determination, processing the first input signal to produce an output signal that simulates a desired control stimulus for the filmmaking tool. This output signal may be transmitted to control operation of the filmmaking tool.

Another set of embodiments provides systems for controlling operation of a camera (or other filmmaking tool). An exemplary system might comprise an input device comprising a manipulable control having a neutral position. The input device might be operable for a user to provide input for controlling operation of the camera/filmmaking tool.

The system might further comprise a control system. An exemplary control system might comprise an input interface for providing communication with the input device and/or an output interface for providing communication with the camera. The control system, in some embodiments, further comprises a processor in communication with the input and/or output interfaces, as well as a computer readable medium having encoded thereon a set of instructions executable by the processor to cause the control system to perform one or more operations.

In an aspect, the set of instructions can include, inter alia, one or more of the following: instructions for establishing a threshold perimeter around the neutral position of the input device; instructions for receiving, via the input interface, a first input signal from the input device, the first input signal resulting from manipulation of the manipulable control; instructions for determining whether the manipulable control is within the threshold perimeter; instructions for processing (e.g., based on a determination that the manipulable control is within the threshold perimeter) the first input signal to produce an output signal that simulates a desired control stimulus for the camera; and/or instructions for transmitting the output signal via the output interface, to control operation of the camera.

Another exemplary computer system for controlling the operation of a controllable object might comprise a processor and a computer readable medium in communication with the processor, the computer readable medium having encoded thereon a set of instructions executable by the processor to cause the computer system to perform one or more operations. The set of instruction might comprise instructions for establishing a threshold perimeter around the neutral position of an input device. In an aspect, the input device comprises a manipulable control having a neutral position and is operable for a user to provide input for controlling operation of the object. The set of instructions might also comprise instructions for receiving, from the input device, a first input signal, which might result from manipulation of the manipulable control. The set of instructions might also include instructions for determining whether the manipulable control is within the threshold perimeter and/or instructions for processing the first input signal to produce an output signal that simulates a desired control stimulus for the object (based, perhaps on a determination that the manipulable control is within the threshold perimeter) and/or instructions for transmitting the output signal via the output interface, to control operation of the object.

An exemplary computer program product might comprise a computer readable medium having encoded thereon computer program comprising a set of instructions executable by a computer to perform one or more operations. The set of instructions might comprise, for example, instructions for receiving a first input signal from an input device. The input device might be configured for a user to provide input for controlling operation of a camera and/or might comprise a manipulable control having a neutral position. Hence, the first input signal might result from manipulation of the manipulable control.

The set of instructions might further comprise instructions for determining whether the manipulable control is within the threshold perimeter and/or instructions for processing (based, perhaps, on a determination that the manipulable control is within the threshold perimeter) the first input signal to produce an output signal that simulates a desired control stimulus for the camera. There may also be instructions for transmitting the output signal to control operation of the camera.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In an aspect, embodiments of the invention provide improved control systems for filmmaking tools, such as real and/or virtual cameras, lights, and/or the like. Such systems can be implemented in software (for example, in animation software, in which the control systems can be used to control the perceived, virtual, and/or simulated "movement" of virtual cameras, as well as characters and other objects), hardware (for examples, in control devices for physical cameras) and/or a combination of both. In another aspect, embodiments of the invention provide methods for controlling such filmmaking tools, including without limitation methods that employ such systems.

As used herein, the term "physical" is intended to mean an actual, real-world object, such as a camera, light, vehicle and/or the like. By contrast, the term "virtual," when applied to such objects, is intended to mean any type of object or effect that is implemented in a software application, such as a filmmaking and/or animation application. Merely by way of example, a virtual camera might represent a perspective of a scene in an animated film, while a virtual light might change the brightness of certain areas in such a scene, provide other illumination effects, and/or the like. By operating a virtual camera, a user can simulate (in an animated film) some or all of the effects of a physical camera that is recording live action, such as panning, zooming, moving relative to the scene, and/or the like. (and, in some cases, effects that are not typically not possible with a physical camera). Similarly, by operating a virtual light source, a user can simulate (e.g., in an animated film) some or all of the effects of physical light source in a live-action film, such as changing illumination angles and/or brightness, creating or masking reflections, shadows, etc. and/or the like (as well, in some cases, as effects that are typically not possible with a physical light source). Operation of virtual props, vehicles, characters, and/or the like can produce animation (e.g., virtual and/or simulated behavior, movement, etc.) of those objects in an animated film.

Beneficially, some embodiments provide a user (also referred to herein as an "operator") of an input device (such as a camera operator, animator, etc.) with the ability to have direct control over the physical and/or virtual movement of a filmmaking tool using an input device, while also allowing for simulated and/or indirect control (e.g., processing of the input from the input device) under certain circumstances, which can include, merely by way of example, when the input device is close to a neutral position at which no input signals are generated. Thus, for instance, some of the tools of the invention can allow for direct control over a camera in large movements but still allow for smooth, controlled movements when slower movement is desired (such as in an ease out situation).

The term "input device," as used herein, means any type of device having a manipulable control that allows a user to provide input (e.g., to a computer, a control system, and/or the like). For purposes of description, in several examples discussed below, a joystick is described as one exemplary input device; it should be appreciated, however, that input devices are not limited to joystick-type controls but instead can include a variety of other types of input devices may be used in other embodiments, including without limitation, a game controller, a mouse, a keyboard, an accelerometer, a steering wheel, an inertial control system, an optical control system, a full or partial body motion capture unit, an optical, and/or a mechanical/electromagnetic system configured to capture the position or motion of an actor, puppet or prop. In an aspect, embodiments of the invention are configured to use any of a variety of commercially-available input game controllers and other input devices; in another aspect, a customized or purpose-built input device may be used.

In accordance with embodiments of the invention, an input device produces an "input signal" that is transmitted to a control system. (While, for ease of description, the input signal is described herein as a singular, continuous signal, one skilled in the art should appreciate that the input signal, in some implementations, may actually be a succession of multiple signals; the general term "input signal" is intended to cover both situations.) The input signal may be digital and/or analog; in an aspect, the input signal has a varying level. In accordance with an embodiment of the invention, the input signal corresponds to a manipulation of a manipulable control on the input device—in some cases, the manipulable control might be a joystick, steering wheel, etc., in which case the input signal has a level, at any given time, that corresponds to a position of the manipulable control at that time. In other cases, the manipulable control might be the input device itself, such as in the case of an accelerometer (in which case, the input signal level would correspond to the acceleration perceived by the accelerometer). In motion capture devices, computer mice, etc., the input signal level might correspond to the velocity (and/or direction) of the motion. Hence, depending on the input device, the input signal level might correspond to a position of a manipulable control, a velocity, an acceleration, a measured force (such as in the case of pressure-sensitive buttons, levers, etc.) and/or the like; accordingly, many (but not all) input devices generate an input signal based on an acceleration sensor, a motion sensor, and/or a position sensor. In some cases, the input signal level might be an analog signal level; in other cases, the input signal level might be a digital value; accordingly, the term "input signal level" is used broadly herein to describe any variable value(s) or level(s) that can be communicated by an input device.

In an aspect, this input signal is used to control operation of a filmmaking tool, such as a camera. In the ordinary course of operation, the input signal is passed directly (perhaps with appropriate conversion and/or modulation) to the tool, allowing the user direct control over the tool using the input device. According to certain embodiments of the invention, when this input signal level falls beneath a specified threshold, the system begins to generate a simulated output, giving the user indirect control over the filmmaking tool (which can, in some aspects, provide several benefits, as described herein). In another aspect, the transition from direct to indirect control is performed automatically, without requiring any user intervention (other than actually manipulating the control itself).

Figure 1:
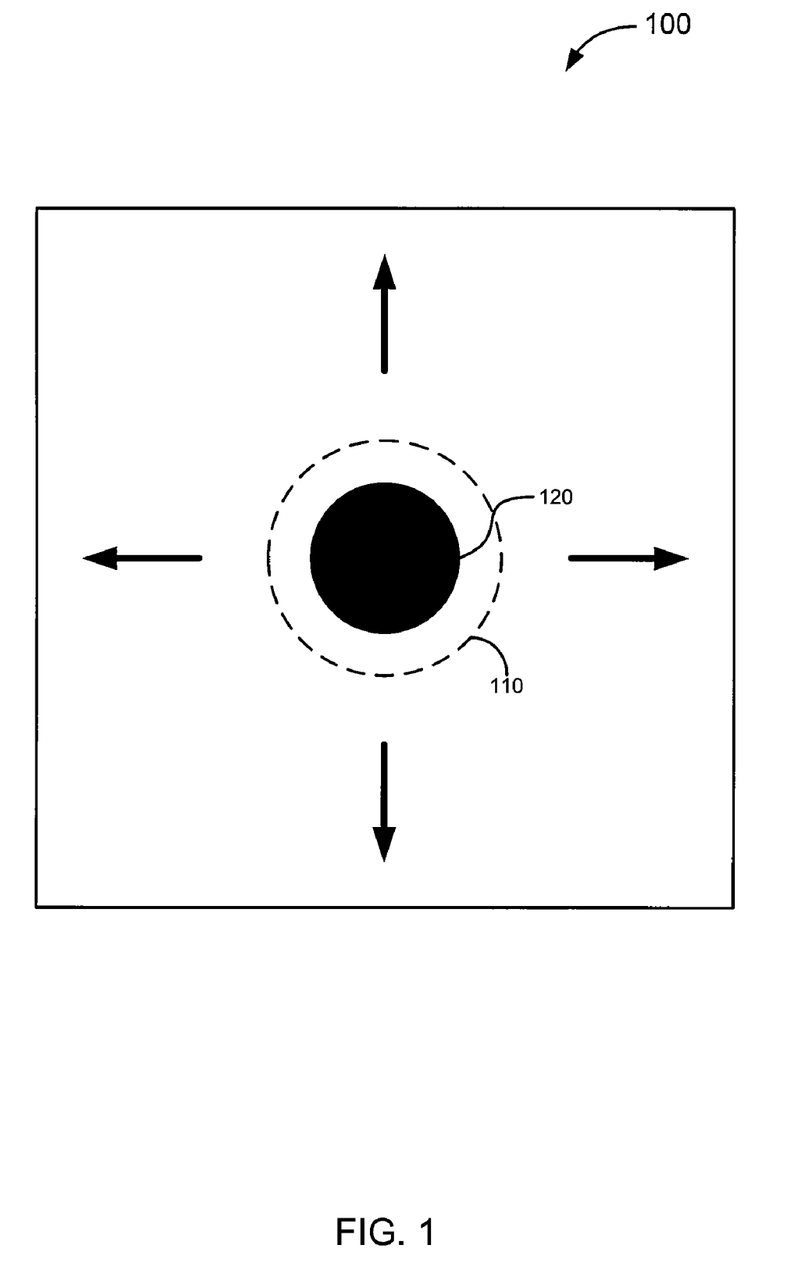
FIG. 1 is a plan view of an input device, in accordance with various embodiments of the invention.
Figure 2:
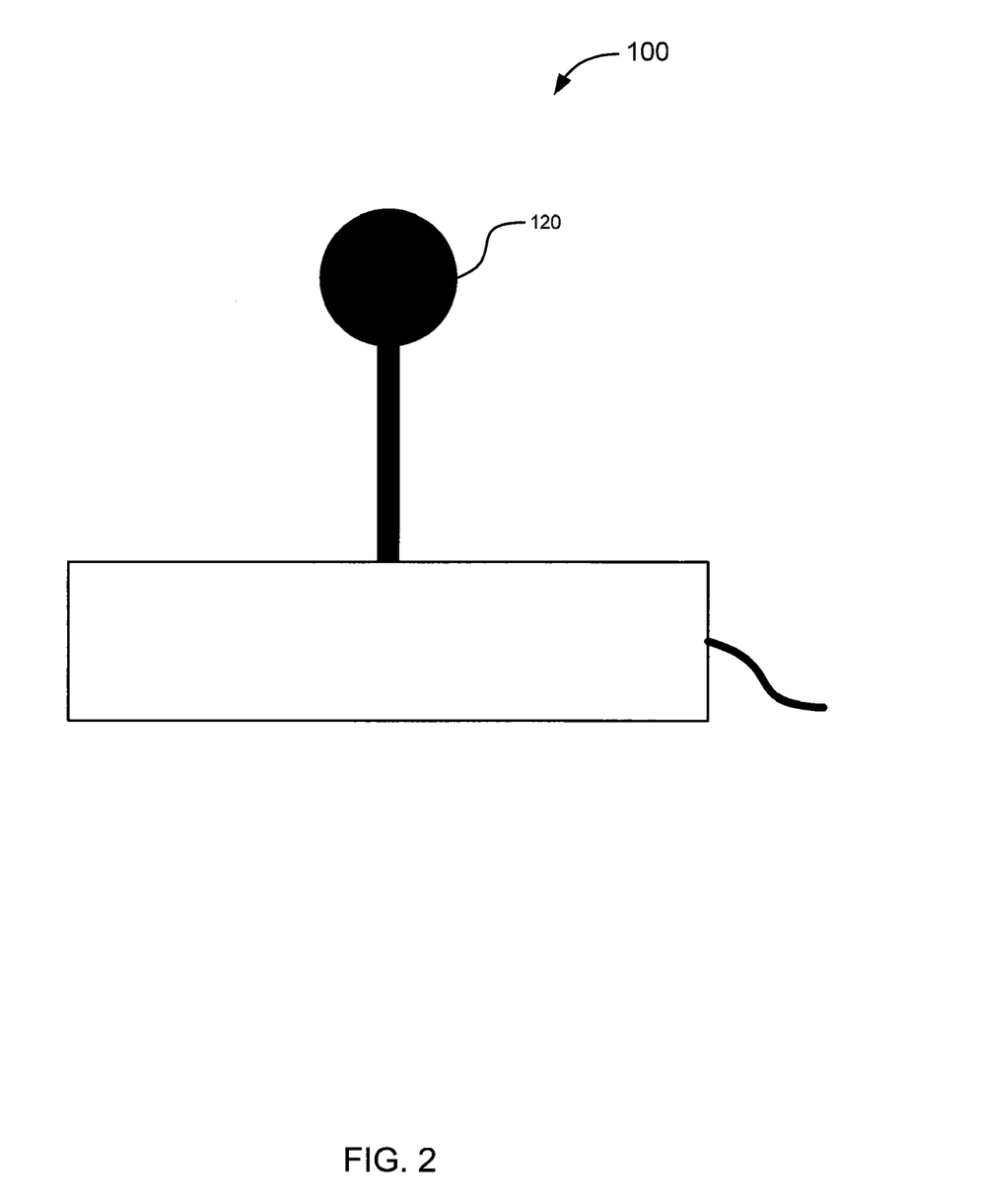
FIG. 2 is an elevation view of the input device of FIG. 1, in accordance with various embodiments of the invention.

To illustrate this point, FIGS. 1 and 2 depict an input device comprising a joystick 100, in which the threshold input level corresponds to a threshold perimeter surrounding the neutral position; this threshold perimeter is conceptually illustrated by the boundary line 110 (although it should be noted that the threshold is not necessarily physically depicted on the joystick itself). When the head 120 of the joystick 100 is within the boundary 110, the input level is below the threshold, and when the head 120 is outside the boundary 110, the input level is above the threshold.

It should be noted that the size and shape of the threshold perimeter indicated by the "boundary" 110 are discretionary and often will depend on the hardware being used. In fact, the size and shape of the threshold may be calibrated and/or modified by the operator in some embodiments. Further, there might be a higher threshold in the forward direction than in the backward direction (or vice-versa), and/or a higher threshold in the forward and backward directions than in the side-to-side directions. Moreover, in some directions, there might be no threshold at all. Hence, in an aspect, the threshold perimeter might comprise a first point in a first (e.g., forward) direction from the neutral position and a second point in a second (e.g., backward) direction from the neutral position. The first point might have a greater distance from the neutral position than the second point (e.g., indicating that the threshold level of the input signal is higher in the forward direction than it is in the backward direction.)

Upon detecting the joystick input crossing below the threshold (e.g., the position of the joystick falling within the threshold perimeter), the system changes mode and begins to output values which generate or simulate a desired ease out control stimulus (decoupling the controlled camera and/or object from the operator's joystick). Possible modes of operation are described in further detail below with respect to FIG. 4.

Figure 3:
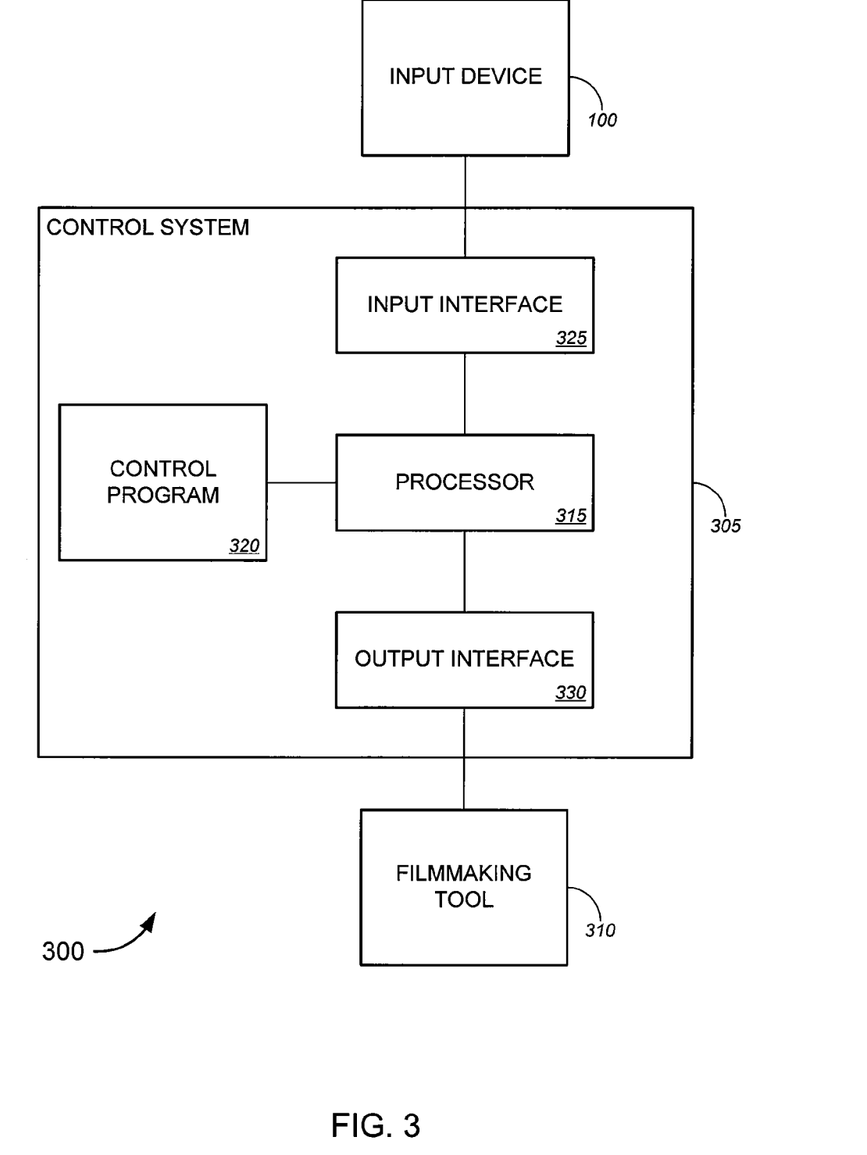
FIG. 3 is a block diagram illustrating a system for controlling operation of a filmmaking tool, such as a camera, in accordance with various embodiments of the invention.

FIG. 3 illustrates a system 300 for controlling operation of a filmmaking tool, in accordance with a set of embodiments. The system 300 includes a control system 305, along with an input device 1 00. Optionally, the system further includes a physical and/or virtual filmmaking tool 310 (or another controllable object) itself. For example, those skilled in the art will appreciate that there are a variety of commercially-available physical objects, such as lighting equipment, video and/or still cameras, vehicles, etc. that provide interfaces for accepting control signals from computers, input devices, and/or the like. Any of such objects can be controlled in accordance with embodiments of the invention. Similarly, virtual objects can be controlled (within an animation software package on a computer, for example) by control signals received by the computer from the input device (and provided to the software by the computer's operating system, for example).

In some embodiments, the control system 305 might be integrated with the input device 100 and/or the filmmaking tool 310 (i.e., the input device 100 and/or the filmmaking tool 310 might comprise the control system 305). In other embodiments, the devices are not integrated, but instead are in communication, as described in further detail below.

As noted above, while many of the descriptions herein pertain to control of real and/or virtual cameras, the system 300 might also employ (or be configured to control) a variety of filmmaking tools including without limitation real (or physical) objects, such as optical transceivers—e.g., a camera and/or a light—a tool, a manned or unmanned vehicle, a flying camera platform, etc.; or a virtual objects, such as virtual cameras, animated characters, objects in virtual scenes, etc.—these virtual objects may be implemented in filmmaking application, such as the filmmaking applications described in the Related Applications). Similarly, as noted above, the input device 100 can be any of a variety of input devices.

In some embodiments, the control system 305 comprises a special-purpose computer employing various hardware (such as application-specific integrated circuits ("ASIC")), firmware and/or software for controlling operation of a filmmaking tool. In other embodiments, the control system 305 comprises a general purpose computer, optionally with a software program executable by the control system to receive input from the input device 100 and/or provide control over the filmmaking tool 310. In other embodiments, the control system 305 comprises a combination of general-purpose and special-purpose computers.

The control system 305 is illustrated functionally in FIG. 3. (FIG. 6, described below, illustrates a hardware architecture that can be used in an exemplary control system.) The control system 305 includes a processor 315, along with a control program 320 that provides instructions executable by the processor 315 to implement the functionality of the invention. The processor 315, in some cases, comprises a general purpose processor, such as the central processing unit ("CPU") chips commonly available from suppliers such as Intel™, AMD™, and the like. In other cases, the processor 315 comprises a special-purpose processor, such as a digital signal processor ("DSP"), ASIC, and/or the like. While the processor 315 is generally referred to in the singular, one skilled in the art should recognize that the processor 315 might comprise a plurality of processors (and/or other electronics) working in conjunction. Merely by way of example the processor 315 might comprise a GPU and a DSP; moreover, depending on the input/output requirements of the input device 100 and/or filmmaking tool 310, one or more digital/analog converters ("DAC") and/or analog/digital converters ("ADC") may be employed as well.

The control system 305 also includes an input interface 325 that provides communication with the input device 100, along with an output interface 330 that provides communication with the filmmaking tool 310. A variety of different types of interfaces (either standardized or proprietary) can be used for either the input interface 325 or the output interface 330; examples include serial interfaces, universal serial bus ("USB") interfaces, IEEE 1394 interfaces, Ethernet interfaces, wireless interfaces (e.g., IEEE 802.11 interfaces, Bluetooth interfaces, infra-red interfaces, etc.), and/or the like. In some implementations, the input interface 325 and/or output interface 330 might also include an ADC and/or DAC.

Figure 5:
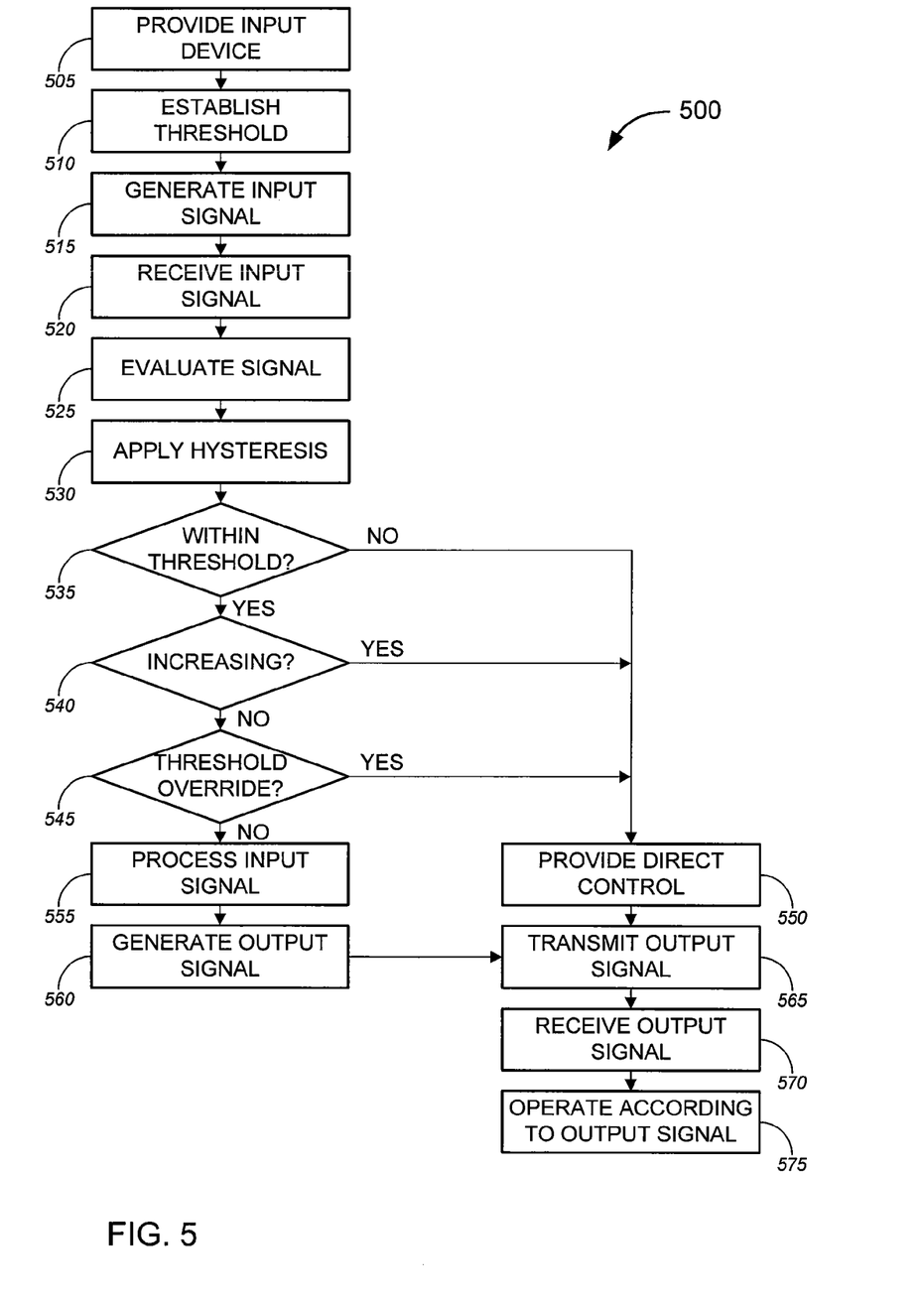
FIG. 5 is a process flow diagram illustrating a method of controlling operation of a filmmaking tool, such as a camera, in accordance with various embodiments of the invention.

The operation of the system 300 (in accordance with one set of embodiments) is discussed in further detail below with respect to FIG. 5. In general, however, a user manipulates a manipulable control on the input device 100, which sends an input signal to the control system 305, which receives the input signal via the input interface 325. Executing instructions from the control program 320, the processor 315 evaluates the input signal to determine whether it is above or below a threshold level. If the input signal is above the threshold level, the processor 315 forwards the input signal (or allows the input signal to proceed) to the output interface 330, where it is transmitted as an output signal for reception by the filmmaking tool 310. If the processor 315 detects that the input signal is below the threshold level (which might, depending on the type of input device 100 used, correspond to the manipulable control being disposed within a threshold perimeter around a neutral position on the input device), the processor 315 processes the input signal to generate an output signal that simulates a desired control stimulus. That output signal is then transmitted to the filmmaking tool 310 via the output interface 330. (Optionally, the user may be provided with an additional control to prevent the processing of the input signal even when the signal is below the threshold level. In that case, the input signal is treated essentially as if it were above the threshold level.)

Figure 4:
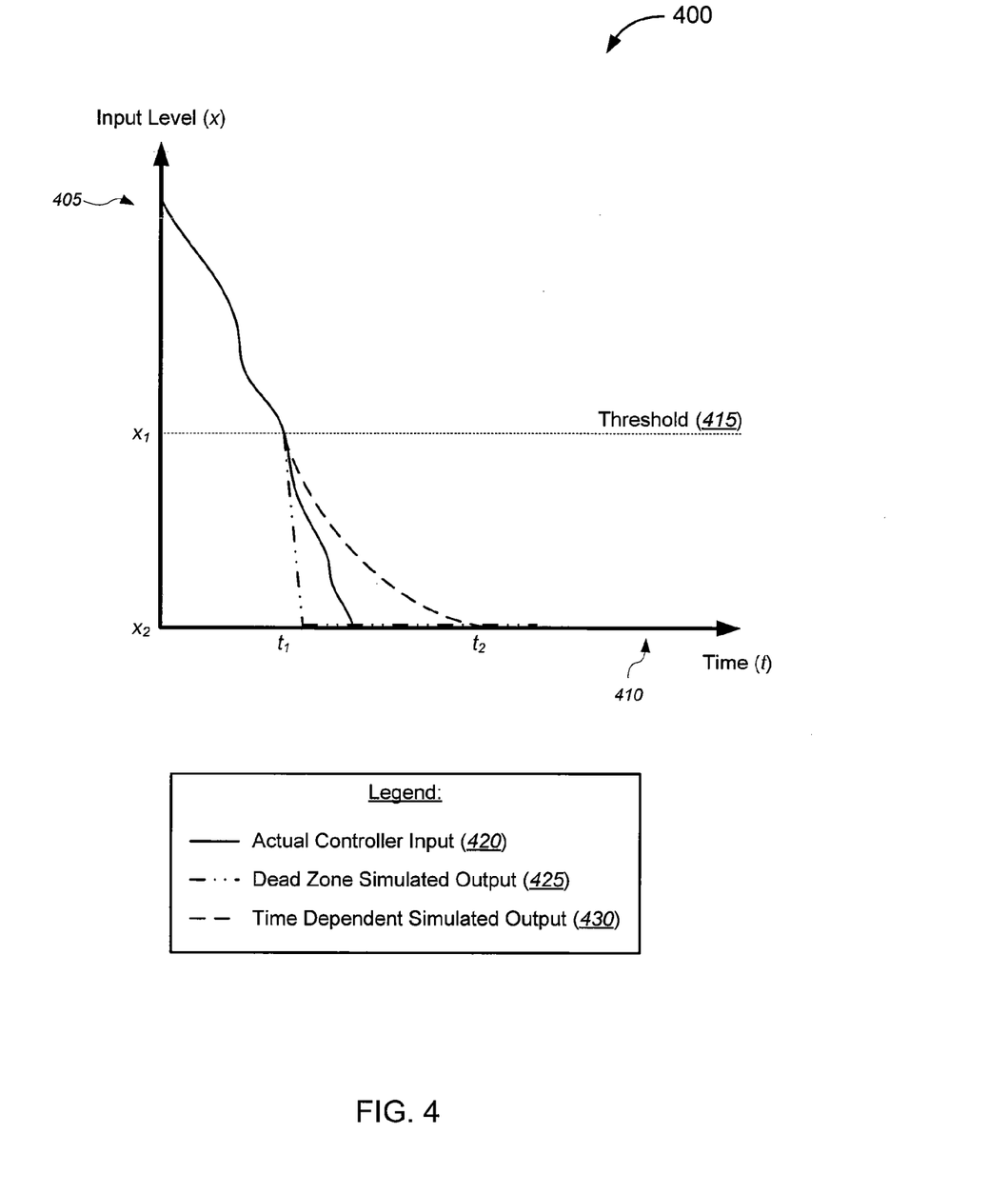
FIG. 4 is a chart illustrating various operating modes of a control system, in accordance with various embodiments of the invention.

There are a variety of ways in which an input signal may be processed by the processor 315 (i.e., to produce output signals of different characters). FIG. 4 illustrates a chart 400 illustrating some of these options. The horizontal axis 410 of the chart 400 corresponds to time (t), while the vertical axis 405 corresponds to the level (x) of the input signal received from the input device. The chart 400 illustrates a scenario in which the input signal level is decreasing over time (e.g., a situation in which, if the input device comprises a joystick, the joystick is being returned toward a neutral position). The threshold input signal level 415 is represented by a dotted line.

The actual input signal 420 is represented on the chart 400 by a solid line. Above the threshold level, the output signal from the control system matches the input signal 420. When the input signal 420 level descends through the threshold 415, the control system begins processing the input signal 420 to generate an output signal. In one example, the control system may implement a "dead zone" in which the generated signal quickly (or, in some cases, immediately) drops to zero (or near-zero), quickly stopping the motion of the camera (or other filmmaking tool). This behavior is illustrated by a line 425 of alternating dashes and dots. Alternatively, as noted above and in further detail below, the processing may be overridden, and the output signal would continue to match the input signal 420, as illustrated by the solid line. (This document refers to the situation in which the output signal matches the input signal as providing the input device with direct control over the filmmaking tool.)

In a set of embodiments, however, the control system generates a signal 430 that is time-dependent. In one such embodiment, for example, the system has a preset ease out period (which may be pre-set by the system, configured by the user, etc.), such that the signal should reach zero (or near-zero) after that period of time. In an aspect, the generated signal 430 might describe a time-dependent output curve (as shown on FIG. 4, for example) that simulates an varying input signal level (which might, for example, correspond to a simulated varying position of a manipulable control on the input device) over a specified period of time.

To illustrate, by reference to the chart 400, $x_1$ represents the input signal level at the time the input signal 420 level crosses the threshold 415, and $t_1$ represents the time that the input signal 420 level crosses the threshold 415 (or substantially that time, subject, for example, to any hysteresis introduced to filter out transient crossings of the threshold level 415). The time-dependent output signal 430 reaches its final value $x_2$ (which in this case is substantially zero, simulating a manipulable control at a neutral position, for example) at time t2. Hence, the ease-out time is illustrated on the chart as the difference between $t_2$ and $t_1$. (Of course, in operation, it is often the ease-out time—i.e., the length of a delay period before reaching $x_2$—that is known and/or specified by the user, and the value of $t_2$ is calculated and/or defined as the ease-out time added to the value of $t_1$.)

The control system, in an aspect, then generates a simulated ease out control stimulus (i.e., the output signal 430) to produce a smooth transition from signal level $x_1$ (at time $t_1$) to signal level $x_2$ (at time $t_2$). These two points, therefore, define the curve described by the generated output signal 430. For example, output signal 430 may be constructed so that it matches the value $x_1$ of the input signal 420 at the time $t_1$ the threshold 415 is crossed (e.g., the signal produced by a joystick at the time it crosses a threshold perimeter). Further, the initial slope of the curve traced by the output signal 430 may match the first time derivative of the input signal 420 at the time ($t_1$) of crossing (in order to provide a smooth and continuous transition from operator control to simulated control).

Hence, in some cases, the duration of the ease-out is modified according to the first derivative of the input value at the time of crossing, i.e., the initial slope of the ease out curve (the curve describing the generated output signal) is based on the slope of the curve describing the actual input. This feature (which may involve a non-linear relationship between the first derivative and the excess ease out time) is a significant advance because it allows the ease out system to effectively deduce the desired type or amount of ease out and provide it to the operator without any conscious action on the part of the operator.

In other words, if the operator wants the camera to stop rapidly (which typically means with little or no ease out), the operator generally will return the joystick or other control to the neutral position in a rapid manner. The high joystick velocity (i.e., the first time derivative of the joystick input value) results in the addition of a minimal or zero ease out time. If the operator wants the camera to come smoothly to a stop, he or she will instinctively try to perform this moment with the joystick, resulting in a lower joystick velocity at the time of threshold crossing. The lower joystick velocity at threshold crossing will cause the system to construct a longer ease out time, resulting in the type of motion the operator desires even in cases where the operator does not know that the ease out system is present.

Optionally, the operator may be provided with a separate control to change the overall scale of the ease out values produced by the system (so, for example, that typical ease out durations might be 2 seconds, or 0.5 seconds, or any other duration desired by the operator). Additionally and/or alternatively, a separate control is provided to change the shape of the ease out curves (i.e., the acceleration/deceleration curves for the camera and/or other controlled object) generated by the ease out system. Such controls can be provided on the input device itself, or as another input device (for example, a particular key on a keyboard).

In some cases, the control system may detect situations where the operator is performing motions which are similar to, but in fact are not, motions requiring ease out, for example where the joystick angle briefly dips below the threshold before returning to an above threshold angle. In this case, the ease out may be terminated and direct control returned to the operator upon the occurrence of specified events, such as, for example, when the joystick value crosses back above the threshold perimeter (possibly crossing above by some finite amount in order to introduce hysteresis into the system) and/or when the operator provides some other indication (e.g., by use of a separate control, such as a button or toggle) that the operator does not require ease out, as described in further detail below.

Certain embodiments can be incorporated in (and/or used in conjunction with) camera and/or object manipulation systems and/or animation software package, such as those described in the Related Applications. Merely by way of example, the improved control systems and methods described herein can be implemented using, as an input device, a controller such as that described in U.S. patent application Ser. No. 11/261,441 and/or might be implemented in animation software such as that described in U.S. patent application Ser. Nos. 11/262,492 and 11/829,722, already incorporated by reference. Optionally, the improved control systems of the present invention may be combined with a conventional inertial simulation or other filtering system, in order to, for example, mimic some of the characteristics of a physical camera stabilization system like a "Steady Cam" or equivalent.

One set of embodiments provides methods of controlling a camera (or other filmmaking tool). FIG. 5 illustrates one such method 500 (although it should be noted that various other methods of the invention incorporate some, but not all, of the procedures illustrated by FIG. 5). In an aspect, some or all of the procedures of the method 500 may be performed by a control system (and/or a person operating a control system), such as the control system 300 described above. It should be noted, however, that methods of the invention (including, inter alia, the method 500) are not limited to implementation by any particular system or apparatus; likewise, the systems of the invention (including, inter alia, the system 300 described above) are not limited to any particular method of operation.

The method 500 comprises providing an input device (block 505). Providing an input device might comprise any of a variety of procedures, including without limitation providing communication between an input device and a control system, configuring the control system to accept input from the input device (e.g., through the use of software drivers, etc.), and/or the like. In an aspect, the input device is configured to allow a user to provide input for controlling operation of a filmmaking tool, such as a camera. In another aspect, the input device comprises a manipulable control configured to provide an input signal of varying levels, in response to manipulation by a user. In an aspect, the manipulable control has a neutral position, at which the input device provides no input signal, and/or provides an input signal that corresponds to no motion of the tool being controlled (both of these situations are referred to herein as providing no input signal).

In a set of embodiments, the method further comprises establishing a threshold input signal level (block 510). In some cases, as noted above, the input device comprises a manipulable control that has a neutral position, in which the position of the manipulable control (and, specifically, the distance of the manipulable control from the neutral position) dictates the input signal level. In such cases, establishing a threshold input signal level effectively establishes a threshold perimeter around the neutral position. In an aspect, when the input signal is below this threshold level (e.g., the manipulable control is within the threshold perimeter), the control system generates simulated output signal levels, while above the threshold level (e.g., outside the threshold perimeter), the control system generates output signal levels corresponding to the input signal levels (and/or passes the input signal directly as the output signal), allowing the user direct control over the filmmaking tool.

Hence, even though the threshold can be considered to be a threshold perimeter around a neutral position of the manipulable control, the threshold perimeter may in fact be established by establishing a threshold signal level at the control system. This threshold level is used, as described below, to evaluate input signals received from the device. The threshold level can be established automatically by the control system (e.g., by programming a default threshold level into the control software) and/or might be user-configurable (e.g., via options provided in a user interface of the software). Optionally, the threshold level might be established by allowing the user to first create a particular signal level (e.g., by manipulating the control in a desired manner), and then indicate to the software that this particular signal level should be used as the threshold.

In accordance with some embodiments, when controlling the filmmaking tool, the user manipulates the manipulable control, perhaps in a conventional manner, according to the type of input device used. This manipulation causes the input device to generate an input signal (block 515), which is transmitted by the input device. This input signal is received at the control system (block 520), e.g., via an input interface, and the control system evaluates the input signal (block 525). In an aspect, evaluating the input signal comprises comparing a level of the input signal with the threshold level. In another aspect, evaluating the input signal might comprise evaluating whether the input signal level is increasing or decreasing (e.g., whether a manipulable control is moving toward or away from the control's neutral position)—this is useful, for example, in cases in which it is desirable to provide a generated output signal when the user is returning the manipulable control to the neutral position, but not when the user is moving the manipulable control away from the neutral position (even during the period when the manipulable control remains within the threshold perimeter).

Optionally, the control system may apply a hysteresis when evaluating the signal (block 530) in order to identify a situation in which the manipulable control only briefly has crossed the threshold (e.g., situations in which a manipulable control only briefly has moved within and/or outside the threshold perimeter). (This hysteresis may be applied when the signal has crossed below the threshold, to identify situations where the input signal only briefly has fallen under the threshold, or alternatively may be applied when the signal has crossed above the threshold, to identify situations in which the input signal only briefly has exceeds the threshold.) Use of the hysteresis prevents the control system from engaging (or disengaging, as appropriate) the signal processing of the invention in cases where the signal only briefly has crossed the threshold.

Based on the evaluation of the input signal, the control system determines whether the input signal level is below the threshold level (e.g., whether the manipulable control is within the threshold perimeter) (block 535). If the input signal level is below the threshold level (e.g., the manipulable control is within the threshold perimeter), the system optionally will determine (again, based on the evaluation of the input signal), whether the input signal level is increasing (block 545) (e.g., whether the manipulable control is moving away from the neutral position). If the input signal level is increasing, it may not be beneficial to generate simulated signals, as noted above. If the input signal level is not increasing, however, it may be beneficial to provide such processing.

Additionally and/or alternatively, even if the input signal falls below the threshold and/or is not increasing, the system optionally may determine whether it has received any additional input from the user to indicate that the user desires direct control over the filmmaking tool even when the input signal level is below the threshold (i.e., whether the user wishes to override the threshold (block 545).

If the control system has received such an input from the user, the control system might provide the input device with direct control over the filmmaking tool, irrespective of whether the original input signal level falls below the threshold (e.g., irrespective of whether the manipulable control is within the threshold perimeter and/or is not increasing) (block 550). Similarly, if it is determined at block 535 that the input signal level is not below the threshold and/or, it is determined at block 540 that the input signal level is increasing, (both of which determinations may be subject to any hysteresis, if applicable), the control system provides the input device (and therefore the user) with direct control over the filmmaking tool. As alluded to above, providing the user (or input device) with "direct control" over the filmmaking tool means, for purposes of this document, that the output signal matches the input signal; e.g., that the control system provides the input signal (with any appropriate conversion and/or modulation) as an output signal. (This is in contrast to providing indirect control, in which the control system generates a simulated signal as the output signal.)

If the control system determines that the user has not provided input indicating an intent to override the threshold (or, in embodiments where this functionality is not present), the control system processes the input signal (block 555) to generate an output signal (block 560). A variety of different processes and/or algorithms can be used to process the input signal. A few such examples are described above. In an aspect, as noted above, the output simulates a desired control stimulus for the filmmaking tool (such as an ease-out operation, to name one example).

The control system then transmits the output signal (e.g., via an output interface) to control operation of the filmmaking tool (block 565). In one aspect, the output signal is transmitted for reception by the filmmaking tool itself. As noted above, depending on the mode of operation, the output signal may either be a generated signal or the input signal itself.

Upon receiving the output signal (block 570), the filmmaking tool operates in accordance with the signal (block 575). For instance, if the output signal includes instructions for a camera to pan, the camera pans in response to the output signal. Similarly, the output signal might include instructions to performs variety of operations, including without limitation locomotion operations, zoom operations, operations to begin filming, stop filming, turn on a light, turn off a light, etc., depending on the nature of the filmmaking tool being controlled.

Figure 6:
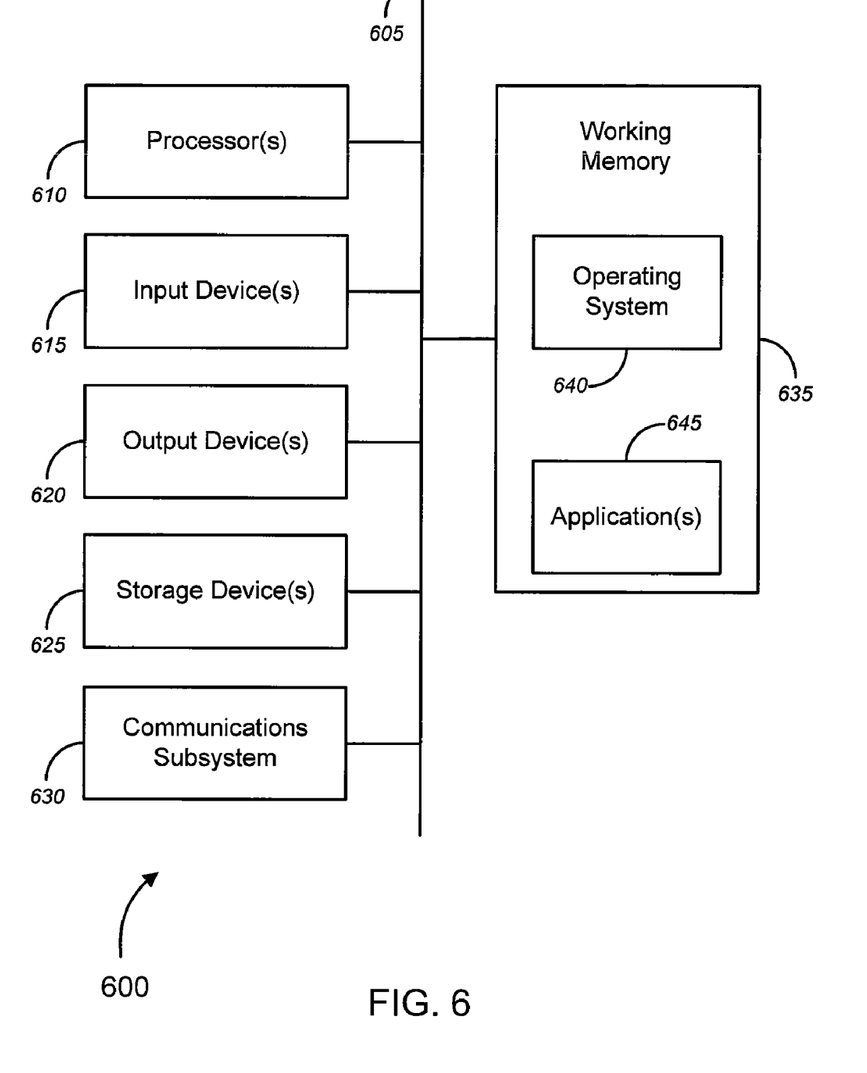
FIG. 6 is a generalized schematic diagram illustrating a computer system, in accordance with various embodiments of the invention.

FIG. 6 provides a schematic illustration of one embodiment of a computer system 600 that can perform the methods of the invention, as described herein, and/or can function as a control system in various embodiments of the invention. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or may function as the input and/or output interfaces described above.

In many embodiments, the computer system 600 will further comprise a working memory 635, which can include a RAM or ROM device, as described below. The computer system 600 also can comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein.

Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
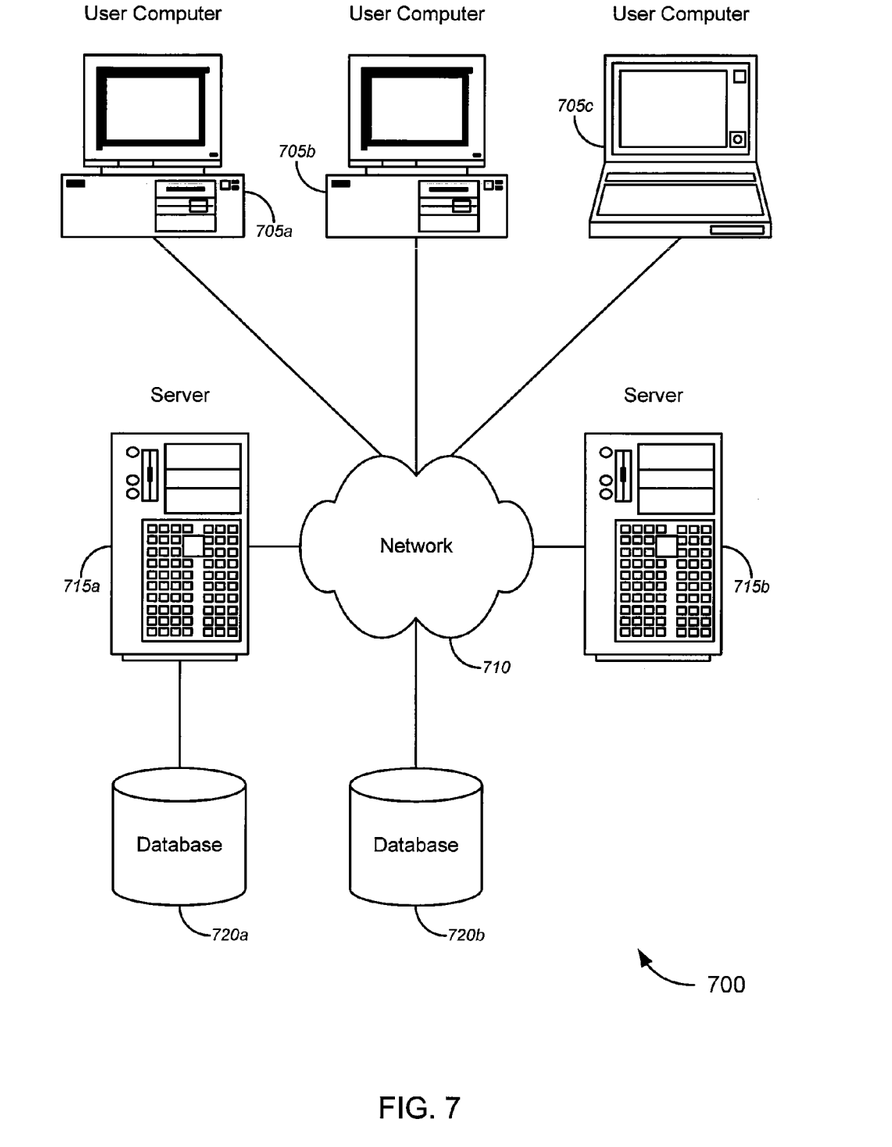
FIG. 7 is a block diagram illustrating a networked system of computers, which can be used in accordance with various embodiments of the invention.

As noted above, a set of embodiments comprises systems for controlling operation of a filmmaking tool, such as a camera. Merely by way of example, FIG. 7 illustrates a schematic diagram of a system 700 that can be used in accordance with one set of embodiments. The system 700 can include one or more user computers 705 (which can function as a control system, for example). The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant, capable of communicating via a network (e.g., the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Merely by way of example, as noted above, in some embodiments, the control systems of the invention might be used with a filmmaking application and/or animation software, such as those programs described in the Related Applications. Such programs might be hosted on a server, either as a dedicated client/server application, as a web application and/or the like. Hence, a user might use a control system to control operation of a filmmaking tool, which then provides output to a server-based filmmaking application. Alternatively and/or additionally, the control system might be hosed on a server computer 715, in which case the input signal from an input device might be transmitted to the server 715 (e.g., via the network 710), which processes the input signal as appropriate (e.g., as described above) and then transmits appropriate output signals to the filmmaking tool.

Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can include one or more applications (such as a filmmaking application—including without limitation the filmmaking applications/animation software disclosed in the Related Applications, a camera control application, etc.) accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any suitable programming language, such as Java™, Visual Basic™, C#™, C, C++, and/or any scripting language, such as Perl, Python, or TCL, as well as combinations of any programming/scripting languages.

The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 705 and/or another server 715. In some embodiments, an application server can create web pages dynamically for displaying the information in accordance with embodiments of the invention, such as for performing filmmaking tasks in a filmmaking application. Data provided by an application server may be formatted as web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720, which can be used, for example, to store data for a filmmaking application, to store data about various input devices (such as, for example, default input signal thresholds, device capabilities, etc.), and/or to store data about various filmmaking tools (e.g., operating characteristics and/or capabilities of the filmmaking tool, etc.). The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 735 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. As an example, while the exemplary embodiments described herein pertain mainly to control of filmmaking tools, it should be appreciated that other embodiments can be used to control a variety of other controllable objects and/or devices that are not necessarily related to filmmaking. Such devices include, without limitation, physical and/or virtual vehicles, video game characters, robots, and/or the like.

Further, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of controlling operation of a camera using an input device and a control system, the method comprising:
   providing an input device for a user to provide input for controlling operation of a camera, the input device comprising a manipulable control having a neutral position at which the input device provides no input signal;
   establishing a threshold perimeter around the neutral position of the input device;
   receiving, at the control system, a first input signal from the input device, the first input signal resulting from manipulation of the manipulable control;
   determining whether the manipulable control is within the threshold perimeter;
   determining whether the manipulable control is moving away from the neutral position;
   based on a determination that the manipulable control is within the threshold perimeter and is not moving away from the neutral position, processing the first input signal to produce an output signal describing a time-dependent output curve that simulates a varying position of the manipulable control over a specified period of time, the time-dependent output curve being defined by a first, actual position $x_{-1}$ of the manipulable control at a first point t1 in time and a second, simulated position x2 of the manipulable control at a second point t2 in time, the first point in time t1 corresponding substantially to a time of determination that the manipulable control is within the threshold perimeter, and wherein the first, actual position x1 of the manipulable control is located substantially at the threshold perimeter; and
   transmitting the output signal to control operation of the camera.

2. A method of controlling operation of a camera using an input device, the method comprising:
   providing an input device for a user to provide input for controlling operation of a camera, the input device comprising a manipulable control having a neutral position;
   establishing a threshold perimeter around the neutral position of the input device, wherein the threshold perimeter comprises a first point in a first direction from the neutral position of the manipulable control and a second point in a second direction from the neutral position of the manipulable control the first point has a first distance from the neutral position of the manipulable control, the second point has a second distance from the neutral position of the manipulable control, and the first distance is greater than the second distance;
   receiving, at a control system, a first input signal from the input device, the first input signal resulting from manipulation of the manipulable control;
   determining whether the manipulable control is within the threshold perimeter;
   processing, based on a determination that the manipulable control is within the threshold perimeter, the first input signal to produce an output signal that simulates a desired control stimulus for the camera; and
   transmitting the output signal to control operation of the camera.

3. The method of claim 2, further comprising:
   based on a determination that the manipulable control is not within the threshold perimeter, providing the input device with direct control over the operation of the camera.

4. The method of claim 2, wherein determining whether the manipulable control is within the threshold perimeter comprises:
   applying a hysteresis when determining whether the manipulable control is within the threshold, in order to identify a situation in which the manipulable control briefly crosses the threshold perimeter.

5. The method of claim 2, wherein processing the input signal is further based on a determination that the manipulable control is moving toward the neutral position, the method further comprising:
   based on a determination that the manipulable control is moving away from the neutral position, providing the input device with direct control over the operation of the camera, irrespective of whether the manipulable control.

6. The method of claim 2, wherein the manipulable control comprises a joystick.

7. The method of claim 2, wherein the threshold perimeter comprises a ring centered on neutral position of the manipulable control.

8. The method of claim 2, wherein the camera is a virtual camera implemented by a filmmaking software application.

9. The method of claim 2, further comprising:
   receiving, at the computer system, a second input signal, the second input signal indicating that an operator of the input device desires direct control over the camera; and
   in response to receiving the second input signal, providing the input device with direct control over the operation of the camera, irrespective of whether the manipulable control is within the threshold perimeter.

10. The method of claim 2, wherein processing the first input comprises generating an output signal based on a first derivative of a value of the input signal.

11. The method of claim 10, wherein the value of the input signal is measured at a time the manipulable control crosses the threshold perimeter.

12. The method of claim 2, wherein processing the first input comprises generating an output signal that describes a time-dependent output curve, the time-dependent output curve simulating a varying position of the manipulable control over a specified period of time.

13. The method of claim 12, wherein the time-dependent output curve is defined by a first, actual position $x_{-1}$ of the manipulable control at a first point t1 in time and a second, simulated position x2 of the manipulable control at a second point t2 in time.

14. The method of claim 13, wherein the first point in time t1 corresponds substantially to a time of determination that the manipulable control is within the threshold perimeter, and wherein the first, actual position x1 of the manipulable control is located substantially at the threshold perimeter.

15. The method of claim 13, wherein the second point t2 in time is specified by the user.

16. The method of claim 13, wherein the second point t2 in time is defined by a delay period added to the first point t1 in time, and wherein a length of the delay period is specified by the user.

17. The method of claim 13, wherein the second, simulated position x2 of the manipulable control is the neutral position.

18. The method of claim 2, further comprising providing a control for a user to set a scale for processing the first input.

19. A system for controlling operation of a camera, the system comprising:
- an input device comprising a manipulable control having a neutral position, the input device being operable for a user to provide input for controlling operation of a camera; and
- a control system, comprising:
- an input interface for providing communication with the input device;
- an output interface for providing communication with the camera;
- a processor in communication with the input interface and the output interface; and
- a computer readable medium in communication with the processor, the computer readable medium having encoded thereon a set of instructions executable by the processor to cause the control system to perform one or more operations, the set of instructions comprising:
- instructions for establishing a threshold perimeter around the neutral position of the input device, wherein the threshold perimeter comprises a first point in a first direction from the neutral position of the manipulable control and a second point in a second direction from the neutral position of the manipulable control, the first point has a first distance from the neutral position of the manipulable control, the second point has a second distance from the neutral position of the manipulable control, and the first distance is greater than the second distance;
- instructions for receiving, via the input interface, a first input signal from the input device, the first input signal resulting from manipulation of the manipulable control;
- instructions for determining whether the manipulable control is within the threshold perimeter;
- instructions for processing, based on a determination that the manipulable control is within the threshold perimeter, the first input signal to produce an output signal that simulates a desired control stimulus for the camera; and
- instructions for transmitting the output signal via the output interface, to control operation of the camera.

20. The system of claim 19, further comprising a camera configured to receive the output signal and operate in accordance with the output signal.

21. The system of claim 20, wherein the camera comprises the control system.

22. The system of claim 19, wherein the input device comprises the control system.

* * * * *